US012436263B2

(12) United States Patent
Takayama

(10) Patent No.: US 12,436,263 B2
(45) Date of Patent: Oct. 7, 2025

(54) IN-VEHICLE SENSOR DEVICE

(71) Applicant: DENSO CORPORATION, Kariya (JP)

(72) Inventor: Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 335 days.

(21) Appl. No.: 17/646,380

(22) Filed: Dec. 29, 2021

(65) Prior Publication Data

US 2022/0120887 A1 Apr. 21, 2022

Related U.S. Application Data

(63) Continuation of application No. PCT/JP2020/025525, filed on Jun. 29, 2020.

(30) Foreign Application Priority Data

Jul. 2, 2019 (JP) .................................. 2019-123590

(51) Int. Cl.
G01S 13/60 (2006.01)
G01S 13/92 (2006.01)

(52) U.S. Cl.
CPC ............... G01S 13/60 (2013.01); G01S 13/92 (2013.01)

(58) Field of Classification Search
None
See application file for complete search history.

(56) References Cited

U.S. PATENT DOCUMENTS 11,555,881 B2 * 1/2023 Lipka .................. G01S 5/16
2011/0006916 A1 * 1/2011 Toledo ................ B62D 15/027
340/932.2

FOREIGN PATENT DOCUMENTS

DE 112015002764 T5 * 3/2017 ............... B60R 1/00
JP 3543116 B2 * 7/2004
JP 3733863 B2 1/2006

OTHER PUBLICATIONS

10 Simultaneous Localization and Mapping, Probabilistic Robotics. Sebastion Thrun, Wolfram Burgard, and Dieter Fox. (2005), MIT Press, 1 pg.

* cited by examiner

Primary Examiner — Vladimir Magloire
Assistant Examiner — Brandon James Henson
(74) Attorney, Agent, or Firm — Maschoff Brennan

(57) ABSTRACT

An in-vehicle sensor device has an active sensor, an odometry sensor and a processing part. The processing part calculates estimated detection values of a stationary object by using position information parameters, a mounting angle of the active sensor, and a detection error of the odometry sensor. The position information parameters specify a relative position relationship between the stationary object and the active sensor. The processing part updates the position information parameters, the mounting angle, and the detection error simultaneously on the basis of a difference between the estimated detection value which has been calculated, and the position values of the stationary object detected by the active sensor.

6 Claims, 11 Drawing Sheets

FIG.7
STATE QUANTITY VECTOR X
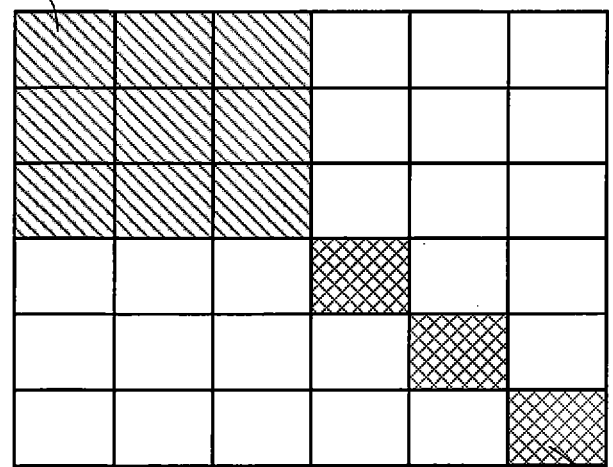
COVARIANCE MATRIX P OF STATE QUANTITY ERROR

IN-VEHICLE SENSOR DEVICE

CROSS-REFERENCE TO RELATED APPLICATION

This application is related to and claims priority from International patent application based on Japanese Patent Application No. 2019-123590 filed on Jul. 2, 2019, the contents of which are hereby incorporated by reference.

TECHNICAL FIELD

The present disclosure relates to in-vehicle sensor devices.

BACKGROUND

There is a radar device which calculates a deviation quantity of an optical axis of the radar device and an error of a vehicle speed detected by a speed sensor by using the azimuth dependence of a relative speed of a vehicle to a stationary object during the straight motion of the vehicle. The radar device corrects the azimuth of the detected object based on the calculated deviation quantity of the optical axis of the radar device, and corrects the vehicle speed on the basis of the calculated error of the vehicle speed. The radar device detects whether the vehicle is moving straight on the basis of the vehicle speed detected by a speed sensor and an angular velocity detected by an angular velocity sensor. However, error contained in detection information of the angular velocity sensor reduces the detection accuracy of the radar device. The inventors of the present disclosure have studied this drawback, and have found that this drawback will cause a possible incorrect detection of the radar device previously described, in which it is determined for the vehicle to move straight even though the vehicle does not move straight, and the radar device calculates an incorrect deviation quantity of the optical axis. This causes an incorrect calculation of the azimuth of the object.

SUMMARY

It is desired for the present disclosure to provide an in-vehicle sensor device having an active sensor, an odometry sensor and a processing part. The active sensor mounted to a moving body detects a relative distance and a relative azimuth between the moving body and a stationary object present around the moving body. The odometry sensor detects a vehicle speed and a yaw rate of the moving body in order to estimate a position and speed of the active sensor. The processing part estimates position information parameters specifying a relative position relationship between the stationary object and the active sensor, a mounting angle of the active sensor, and a detection error of the odometry sensor. The processing part further performs an estimation process and updating process. The estimation process calculates estimated detection values corresponding to the estimated values of the detected position values of the stationary object based on the position information parameters, the mounting angle of the active sensor and the detection error of the odometry sensor. The updating process updates the position information parameters, the mounting angle of the active sensor and the detection error of the odometry sensor, simultaneously on the basis of a difference between the estimated detection value, which has been calculated, and the detected position values of the stationary object detected by the active sensor.

BRIEF DESCRIPTION OF THE DRAWINGS

A preferred, non-limiting embodiment of the present disclosure will be described by way of example with reference to the accompanying drawings, in which:

FIG. 7 is a view showing a state vector and a covariance matrix of a state quantity error;

DESCRIPTION OF EMBODIMENTS

Next, a description will be given of an embodiment of the present disclosure according to the present disclosure with reference to drawings.

1. Structure

Figure 1:
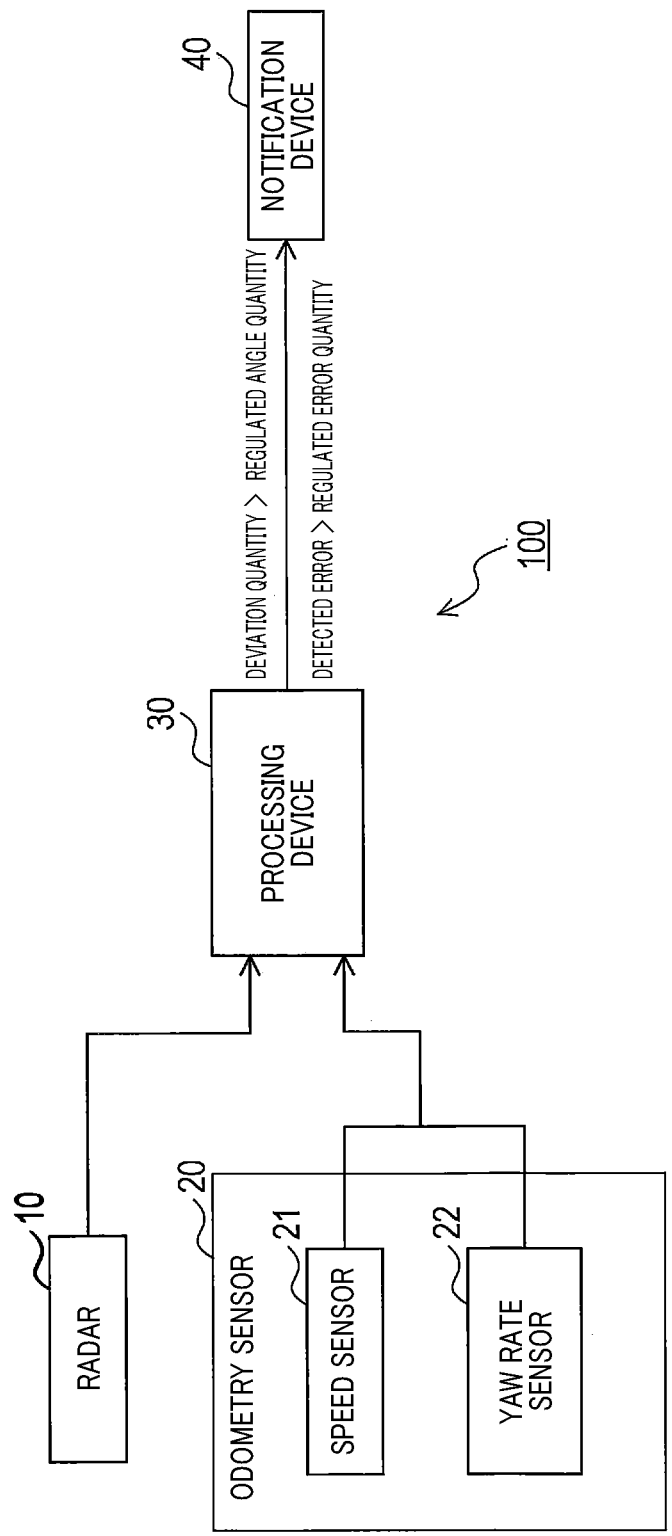
FIG. 1 is a block view showing a structure of an in-vehicle sensor device according to an embodiment of the present disclosure.

A description will now be given of a structure of an in-vehicle sensor device 100 according to the present embodiment with reference to FIG. 1 to FIG. 3. The in-vehicle sensor device 100 has a radar 10, an odometry sensor 20, a processing device 30 and a notification device 40. The in-vehicle sensor device 100 is mounted to a vehicle 80. In the present embodiment, the vehicle 80 corresponds to a moving body.

The radar 10 is arranged at a front center position (for example, at the back side of a bumper or an emblem) of the vehicle 80. The radar 10 is an active sensor for transmitting millimeter waves and receiving reflected waves thereof. In the structure of the in-vehicle sensor device 100 according to the present embodiment, the radar 10 is arranged so that an optical axis Lr of the radar 10 is aligned with a vehicle center line Lo. However, a deviation of the optical axis Lr from the vehicle center line Lo often occurs due to aging or the like.

Figure 2:
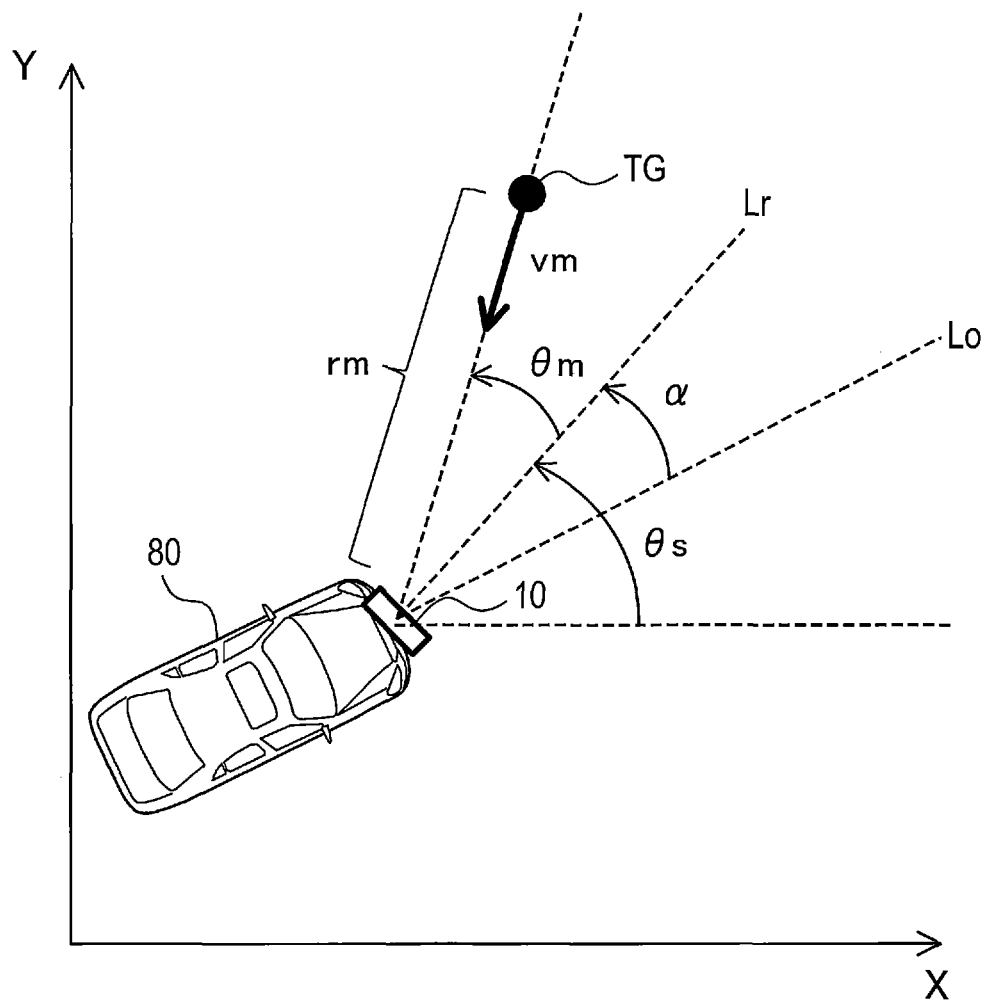
FIG. 2 is a view showing a relative distance, a relative azimuth and a relative speed of an object detected by a radar in the in-vehicle sensor device.
Figure 3:
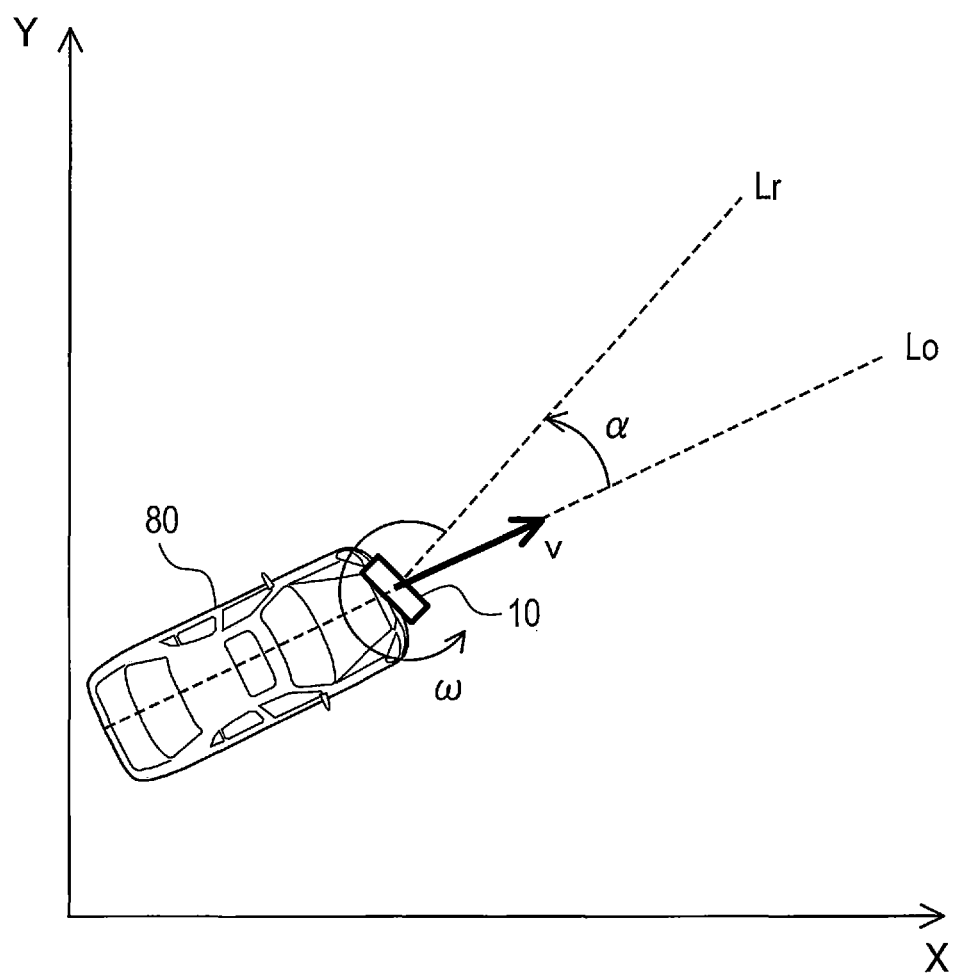
FIG. 3 is a view showing a vehicle speed and a yaw rate detected by an odometry sensor in the in-vehicle sensor device.

As shown in FIG. 2, in the present embodiment, a mounting angle $\alpha$ in a lateral direction of the radar 10 represents an angle between the optical axis Lr and the vehicle center line Lo, and the direction $\theta s$ of the radar 10 represents an angle between the optical axis Lr and the axis X. A difference between a reference angle as a reference mounting angle and a current mounting angle $\alpha$ represents a deviation quantity of the mounting angle $\alpha$. In the present embodiment, the reference angle is 0°. For example, the reference angle becomes 45° when the radar 10 is mounted to the vehicle 80 in which the optical axis Lr is inclined to the vehicle center line Lo.

As shown in FIG. 2, the radar 10 transmits millimeter waves and receives reflected waves thereof so as to detect a relative distance rm of a target object TG to the radar 10, a relative azimuth θm of the target object TG to the radar 10, and a relative speed vm of the target object TG to the radar 10. The radar 10 transmits the detected values to the processing device 30. In the present embodiment, the relative azimuth θm is determined based on the optical axis Lr of the radar 10 as a standard.

It is acceptable to mount the radar 10 to a rear center side or a side of the vehicle 80 instead of to a front center position of the vehicle 80. It is acceptable to mount a plurality of radar devices 10 to the vehicle 80. It is also acceptable to use a Laser radar instead of a millimeter wave radar.

The odometry sensor 20 has a speed sensor 21 and a yaw rate sensor 22. As shown in FIG. 3, the speed sensor 21 detects a rotational speed of the wheels of the vehicle 80. The speed sensor 21 multiplies the detected rotational speed with a diameter of the wheels so as to convert the detected rotational speed to a detected value v of the vehicle speed. The diameter of the wheels has a constant value. The yaw rate sensor 22 detects a yaw rate ω of the vehicle 80. The speed sensor 21 and the yaw rate sensor 22 transmit the detected values to the processing device 30. It is acceptable for the odometry sensor 20 to have another sensor in addition to the speed sensor 21 and the yaw rate sensor 22.

The processing device 30 is composed mainly of a microcomputer having a CPU, a ROM, a RAM and an I/O. The processing device 30 receives various detected values transmitted from the speed sensor 21 and the yaw rate sensor 22.

The radar 10 is mounted to the vehicle to satisfy the arrangement in which the optical axis Lr of the radar 10 aligns with the vehicle center line Lo. However, as shown in FIG. 2, there is a possible case in which the mounting angle α of the radar 10 deviates from the reference angle due to aging and a collision accident. When the mounting angle α of the radar 10 deviates from the reference angle, the lateral position of the target object TG deviates from the true position of the target object TG. This increases the estimated error of the lateral position of the target object TG in a tracking process of the target object TG, and often loses sight of the target object TG due to the increase of the estimated error of the lateral position of the target object TG. Further, because the lateral position of the target object TG deviates from the true position viewed from the vehicle 80 is, this causes the difficulty to detect whether the vehicle 80 is present on the correct drive lane on which the vehicle 80 is running, or whether the vehicle 80 is present on an adjacent drive lane.

Figure 4:
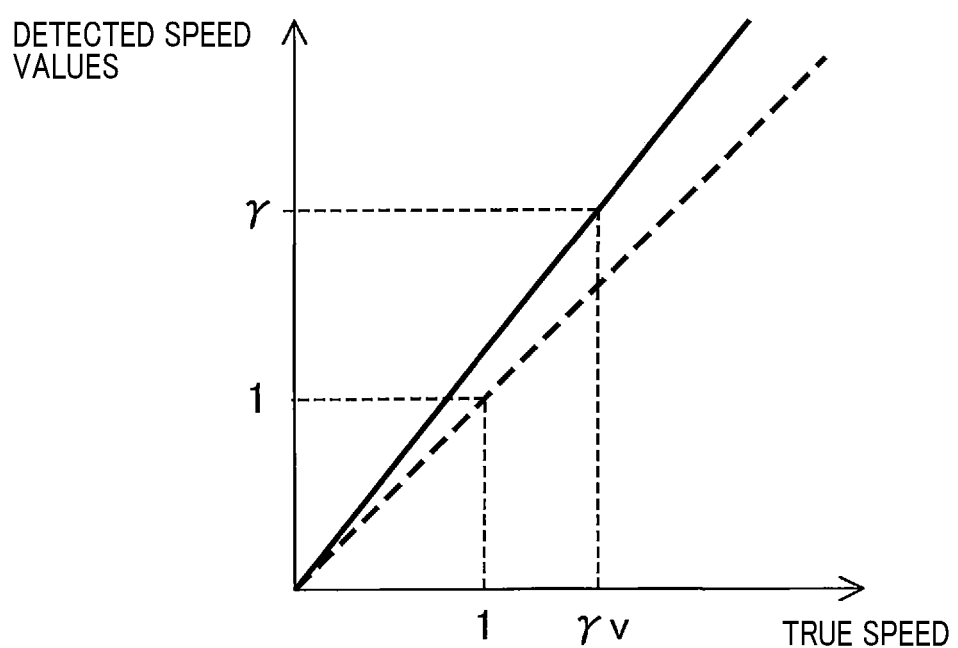
FIG. 4 is a view showing a detected vehicle speed and a true vehicle speed.

The detected value v of the vehicle speed is obtained by multiplying the rotational speed detected by the speed sensor 21 with the diameter of the wheels of the vehicle 80. There is a possible case in which the wheels are replaced with new wheels or the diameter of the wheels is changed due to air pressure of the wheels. When the diameter of the wheels of the vehicle 80 changes, as shown in FIG. 4, the detected value v of the vehicle speed deviates from the true speed of the vehicle 80. When the detected value v of the vehicle speed contains a detection error, this increases a calculation error contained in a ground speed of the target object TG, and accordingly this causes the difficulty to judge whether the target object TG is a stationary object or a moving body.

As shown in FIG. 4, the higher the vehicle speed v of the vehicle 80 is, the greater the detection error of the vehicle speed v of the vehicle 80 becomes. In the present embodiment, a ratio of the detected value v of the vehicle speed to the true speed of the vehicle 80 is designated with the reference character γ (hereinafter, the speed error ratio γ). That is, the true speed to the detected value v of the vehicle speed is designated with the reference character γv.

Figure 5:
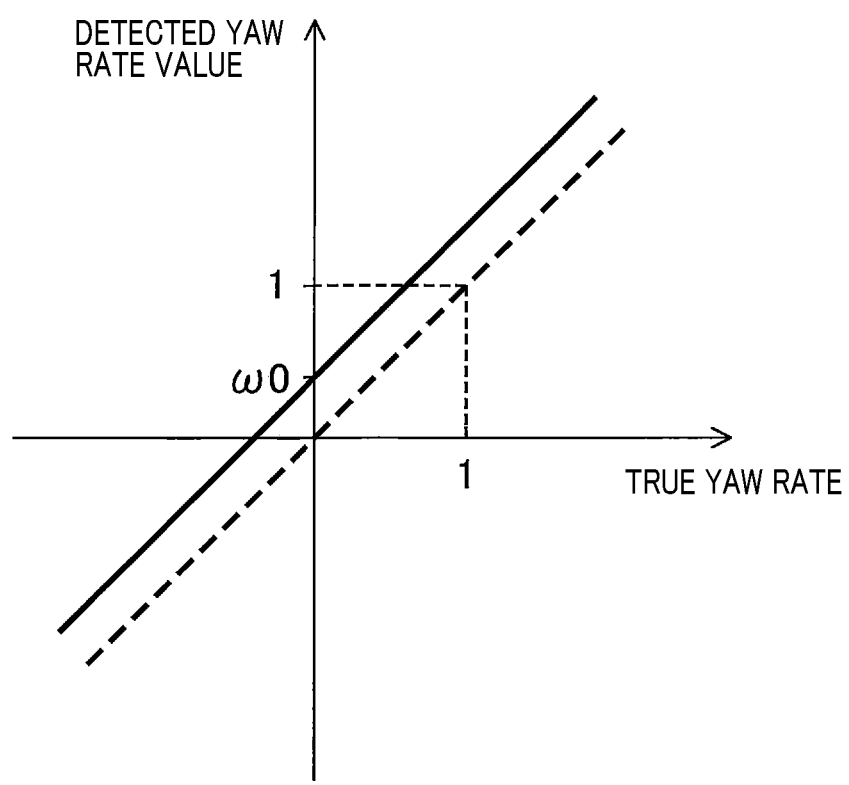
FIG. 5 is a view showing a detected yaw rate and a true yaw rate.

As shown in FIG. 5, the detected value of the yaw rate ω detected by the yaw rate sensor 22 often contains a DC offset value. When the detected value of the yaw rate ω contains a DC offset value, the detected value of the yaw rate ω deviates from the true yaw rate. As a result, because the incorrect detection for the vehicle to be going on a curve occurs even though the vehicle is going straight, an estimated error of the lateral position of the target object TG increases, and this easily losses the target object TG. The present embodiment uses an offset error ω0 contained in the detected value of the yaw rate ω. Hereinafter, both the speed error ratio γ and the offset error ω0 will be referred to as the detection errors γ, ω0.

The processing device 30 updates the mounting angle α, and the detection errors γ, ω0 of the odometry sensor 20 simultaneously every time when receiving the position information of the stationary object detected by and transmitted from the radar 10. The processing device 30 calculates the position of the objects including moving objects and/or a ground speed thereof on the basis of the updated mounting angle α and/or the updated detection errors γ, ω0 of the odometry sensor 20. The processing device 30 detects the presence of the objects on the basis of these calculated values. The object recognition process performed by the processing device 30 will be described later.

The processing device 30 transmits a notification instruction to the notification device 40 when a deviation quantity of the mounting angle α of the vehicle 80 from the reference angle exceeds a regulated angle quantity, or when the detection errors γ, ω0 of the odometry sensor 20 exceed respective regulated error quantities. The regulated angle quantity corresponds to the maximum value of a possible correction quantity. The regulated error quantity represents a maximum value of a possible correction quantity of the detected value of the vehicle speed v and a maximum value of a possible correction quantity of the detected value of the yaw rate ω.

The notification device 30 is a display device, a speaker device, a human machine interface. etc. When receiving the notification instruction transmitted from the processing device 30, the notification device 40 informs to users the notification regarding the occurrence that the deviation quantity and/or the detection error exceeds its regulated quantity through the display and sound.

2. Processing

Figure 6:
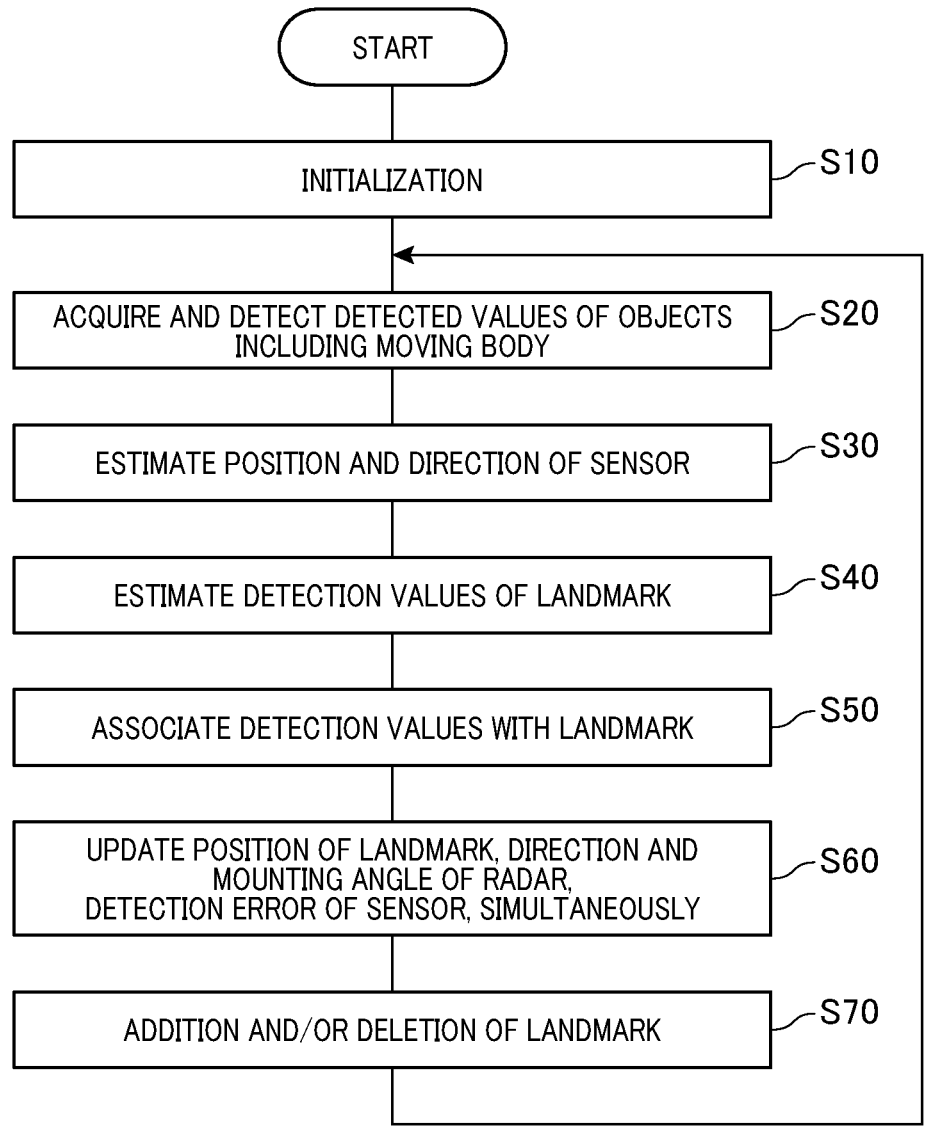
FIG. 6 is a flow chart showing an object recognition process according to an embodiment of the present disclosure.

A description will be given of the object recognition process performed by the processing device 30 with reference to the flow chart shown in FIG. 6. The processing device 30 performs the object recognition process by using a process framework of the extended Kalman filter. The present embodiment will use, as the detected values of the radar 10, the detected position values of the radar 10, i.e., the relative distance rm and the relative azimuth θm. It is also acceptable to perform the object recognition process previously described by using the relative distance rm, the defines an average value of each parameter to be estimated as a state quantity vector, and defines an error covariance between the parameters as a covariance matrix of state quantity error (hereinafter, referred to as the covariance matrix P). The process framework updates the current state quantity vector X and the current covariance matrix P based on an estimation model which estimates the current state quantity vector X from a last state quantity vector, and an observation model which converts the state quantity to a detected value detected by the sensors.

The initialization assigns a respective initial value to the state quantity vector X and the covariance matrix P. The present embodiment uses specific parameters to be estimated, which include the X coordinate value Xs and the Y coordinate value Ys of the radar 10, the direction θs of the radar 10, the speed error ratio γ, the mounting angle α of the radar 10, the offset error ω0 and X coordinate value and the Y coordinate value (x1_1, y1_1, ..., x1_N and y1_N) of first to Nth landmarks (i.e. stationary objects), where N is a natural number.

Because no landmark is registered at the initial state, the state quantity vector X is composed of six elements (xs, ys, θs, γ, α, ω0) shown in FIG. 7. The covariance matrix P is a 6×6 matrix, conforming with the state quantity vector X.

The present disclosure assigns zero as the initial value to xs, ys and θ, and assigns zero as the initial value to the top diagonal element and the top non-diagonal element corresponding to xs, ys and θs of the covariance matrix P (i.e., the region P1 of the covariance matrix P). The initial value of γ, α, ω0 is its ideal value without any error. The present embodiment uses γ=1, α=0, ω0=0 as its initial value. The diagonal element (i.e. in the region P2 of the covariance matrix P) corresponding to γ, α, ω0 of the covariance matrix P is determined based on an estimated error covariance or a possible error maximum value. The non-diagonal elements (i.e. in the region excepting the region P1 and the region P2 in the covariance matrix P) of γ, α, ω0 of the covariance matrix P are zero.

In S20, the radar 10 performs the process of acquiring detected value of an object so as to receive the detected speed value and the detected yaw rate value transmitted from the odometry sensor 20. This object contains a moving body and a stationary object present in the detectable distance area of the radar 10. When the radar 10 detect K objects, the detected position values contain the relative distance rm_1, rm_2, ..., rm_K, the relative azimuth θm_1, θm_2, ..., θm_K, and the relative speed vm_1, vm_2, ..., vm_K, where K is a natural number.

Next, the operation flow progresses to S70, without performing S30 to S60 because no landmark has been registered in the initial processing cycle. In S70, a landmark is added or deleted. In the initial processing cycle, a landmark is only added because no landmark has been registered.

Figure 8:
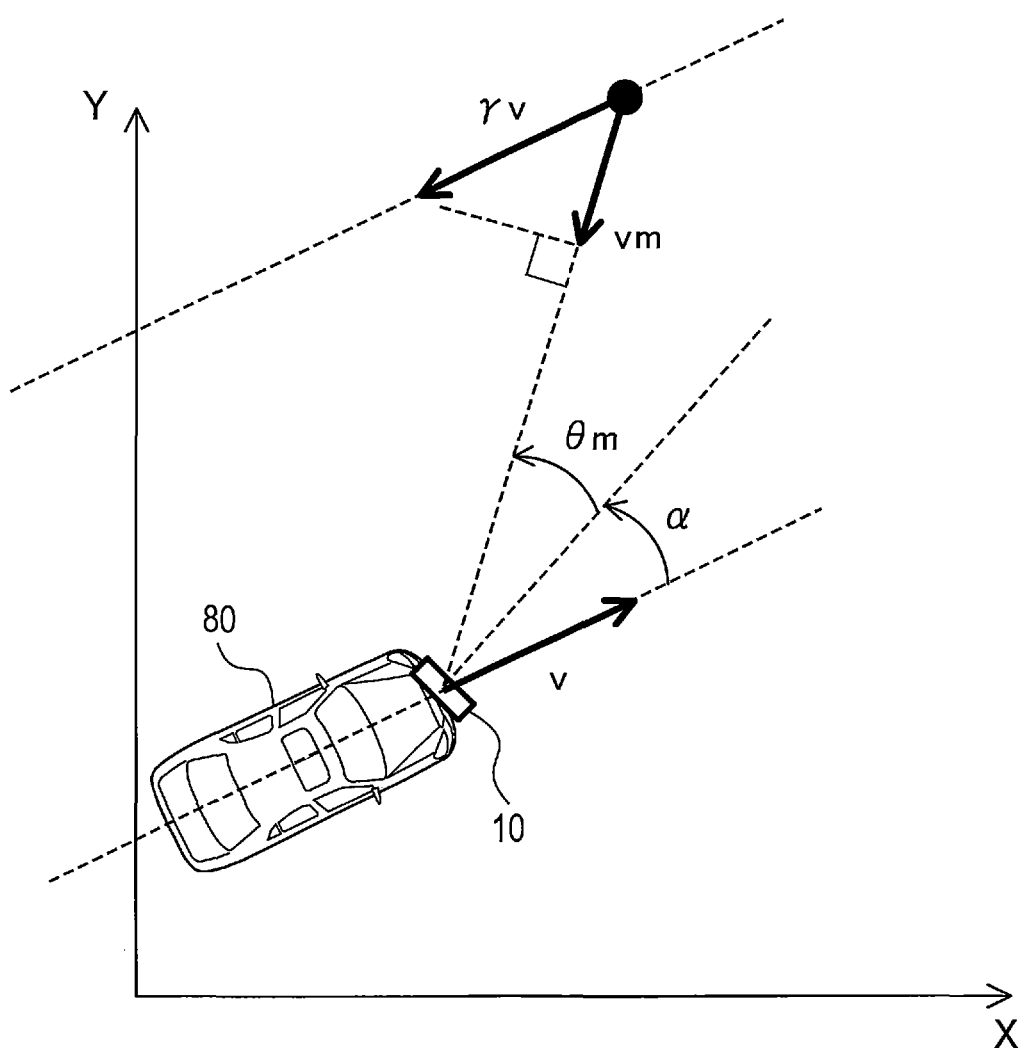
FIG. 8 is a view explaining a detection method of detecting a landmark.

Specifically, S70 registers the landmark only as the stationary object in the objects detected in S20. As shown in FIG. 8, when the detected object is a stationary object, the detected relative speed vm is designated by a projection component γv×cos (α+θm) of the true vehicle speed which is projected toward the direction of the stationary object. When an absolute value of γv×cos (α+θm)−vm is less than a predetermined difference threshold value, it is determined that the detected object is a stationary object.

Figure 10:
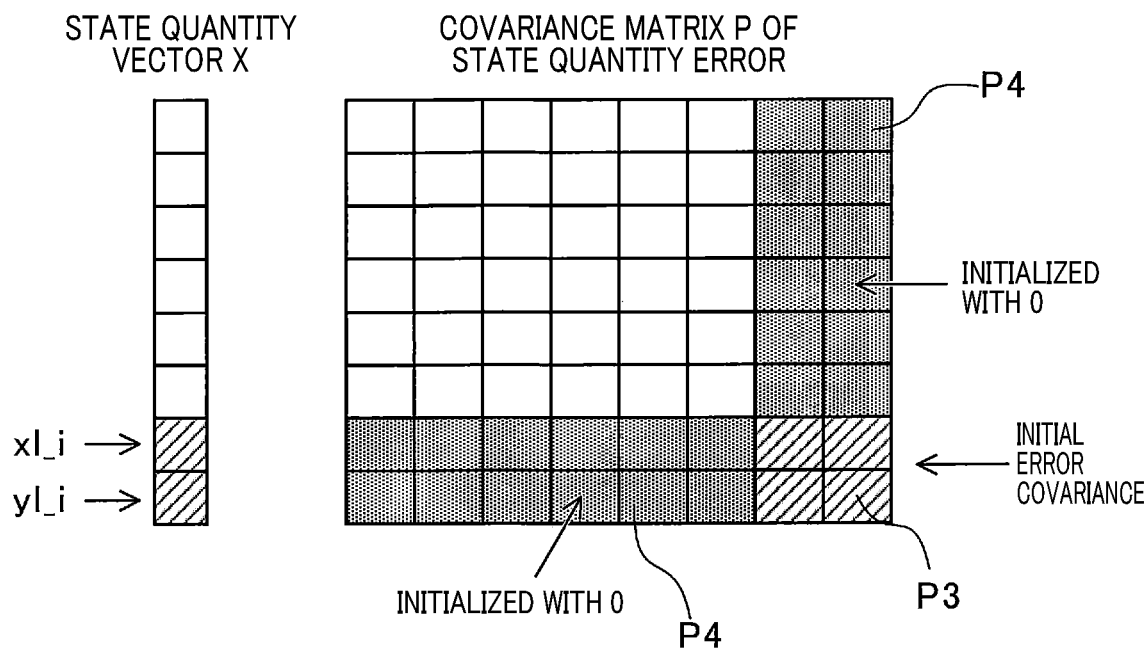
FIG. 10 is a view explaining, for a newly registered landmark, a relationship between the state vector and the covariance matrix of the state quantity error.

The stationary object as the detected object is registered as a landmark. Specifically, when N stationary objects are detected, as shown in FIG. 10, X coordinate values x1_$i$ and Y coordinate values y1_$i$ of the N stationary objects are added into the state quantity vector X, where i is a natural number of 1 to N. The state quantity vector X becomes a vector having 6+2N vector elements. In the present embodiment, the X coordinate value xs and the Y coordinate value ys of the radar 10, the direction θs of the radar 10 and the X coordinate value x1_$i$ and the Y coordinate value y1_$i$ of each stationary object correspond to the position information parameters specifying the relative position relationship between the radar 10 and each landmark.

A self-covariance matrix of the new landmark to be newly registered, a mutual covariance matrix of the new landmark with another state quantity are added to the covariance matrix P. The values of the self-covariance matrix (i.e. in the region P3 of the covariance matrix P) are initialized with an error distribution adjusted by the detection error (rm_i, θm_i) of the object position detected by the radar 10. For example, a value of the self-covariance matrix has a minute quantity (ΔPx, ΔPy). Further, a value of the mutual covariance matrix (i.e. the region P4 of the covariance matrix P) is assigned to zero because of having no relationship at the initial state. The covariance matrix P is a matrix of (6+2N)×(6+2N) elements.

Next, the operation flow returns to S20, the detected position values rm, θm and vm of the object, the detected speed value v and the detected yaw rate ω are acquired.

In S30, the X coordinate value xs and the Y coordinate value ys of the radar 10, and the direction θs of the radar 10 are estimated by using the detected value of the odometry sensor 20 so as to calculate an estimated vector X'.

Specifically, a moved quantity ΔA1 of the vehicle 80 during a period ΔT is designated with γvΔT. The moved quantity Δx of the X coordinate value of the radar 10 corresponds to a projected component of the moved quantity ΔA1 in the X axis direction. That is, the moved quantity Δx=γvΔT cos (θs−α) is satisfied. Further, a moved quantity Δy of the Y coordinate value of the radar 10 corresponds to a projected component of the moved quantity ΔA1 in the Y axis direction. That is, the moved quantity Δy=γvΔT sin (θs−α) is satisfied. The period ΔT corresponds to the repetition period of S20 to S70.

A rotational quantity ΔA2 of the vehicle 80 during the period ΔT is designated with (ω−ω0) ΔT. The deviation quantity Δθs of the direction of the radar 10 becomes equal to the rotational quantity ΔA2. Accordingly, the equation of Δθs=(ω−ω0) ΔT is satisfied. Accordingly, the estimated vector X' is expressed by the following equation (1).

$$X' = \begin{bmatrix} xs' \\ ys' \\ \theta s' \\ \gamma' \\ \alpha' \\ \omega 0' \\ x1\_1' \\ y1\_1' \\ \vdots \\ x1\_N' \\ y1\_N' \end{bmatrix} = \begin{bmatrix} xs + \gamma v \Delta T \cos(\theta s - \alpha) \\ ys + \gamma v \Delta T \sin(\theta s - \alpha) \\ \theta s + (\omega - \omega 0) \Delta T \\ \gamma \\ \alpha \\ \omega 0 \\ x1\_1 \\ y1\_1 \\ \vdots \\ x1\_N \\ y1\_N \end{bmatrix} \quad (1)$$

Further, an error is added to the top diagonal element of the elements which correspond to xs, ys and θs of the covariance matrix P, and zero or the minimum quantity is assigned to other elements in order to calculate the estimated relative azimuth θm and the relative speed vm as the detected values of the radar 10.

In S10, the processing device 30 performs an initialization. The process framework of the extended Kalman filter covariance matrix P'. The error is calculated considering a random error of the odometry sensor 20. The estimated covariance matrix P' is expressed by the following equation (2).

$$P' = P + \begin{bmatrix} \Delta P\_xs & & & \\ & \Delta P\_ys & & \\ & & \Delta P\_\theta s & \\ & & & \text{ALL OTHER ELEMENTS ARE 0} \end{bmatrix} \quad (2)$$

In S40, estimated detection values rm_i', θm_i' as estimated values of the detected position values of each registered landmark are calculated. That is, the estimated detection values rm_i', θm_i' are calculated by using the estimated X coordinate value xs', the estimated Y coordinate value ys' and the estimated direction θs of the radar 10 which have been calculated in S30. Specifically, with reference to FIG. 9, the estimated detection values rm_i', θm_i' are calculated by using the following equation (3).

$$rm\_i' = \text{sqrt}((xl\_i' - xs')^2 + (yl\_i' - ys')^2)$$

$$\theta m\_i' = \arctan((yl\_i' - ys)/(xl\_i' - xs)) - \theta s' \quad (3)$$

Figure 11:
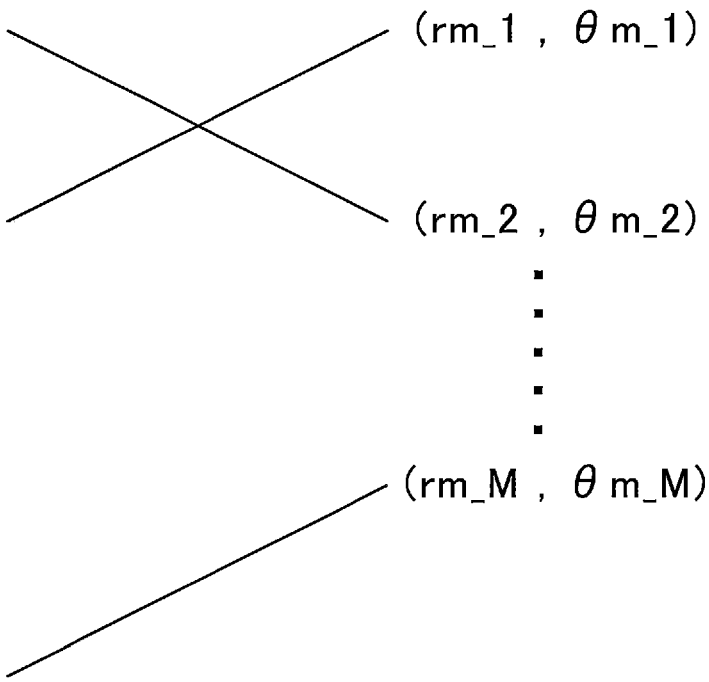
FIG. 11 is a view showing a correspondence between estimated detection values and detected position values.

In the following S50, as shown in FIG. 11, each landmark calculated in S40 and the detected position values rm_j, θm_j are associated together, where i is a natural number of 1 to N, and j is a natural number of 1 to M.

Specifically, for example, it is possible to use the Global Nearest Neighbor method so as to perform the process previously described. That is, a cost between the detected position values within a specified range viewed from the landmark and the estimated detection values of each landmark is defined. The landmark and the detected position values are associated together so that a total sum of the costs between the estimated detection values and the detected position values which have been associated together has a minimum value. The cost is calculated so that the closer the difference between the estimated detection values and the detected position values is, the smaller the cost is. It is possible to associate in order the estimated detection values and the detected position values of each landmark which are closer.

In the following S60, the X coordinate value x1_i, the Y coordinate value y1_i of the registered landmark, the X coordinate value xs and the Y coordinate value ys of the radar 10, the direction θs of the radar 10, the mounting angle α of the radar 10, and the detection errors γ, ω0 of the odometry sensor 20 are updated simultaneously.

Specifically, in S50, a detection Jacobian matrix H is calculated on the basis of the combination of the detected position values and its landmark which have been associated together. In the following explanation, the n-th landmark and the m-th detected position values are associated, where n and m are natural numbers. As shown in the equation (4), the detection Jacobian matrix H is calculated by using the estimated detection values rm_n', θm_n' of the n-th landmark. The detection Jacobian matrix H is a matrix of 2×(6+2N). In the elements corresponding to the 1st to N-th landmarks, all of the elements excepting from the elements corresponding to the n-th landmark are zero.

$$H = \begin{bmatrix} \frac{\partial rm'_n}{\partial xs} & \frac{\partial rm'_n}{\partial ys} & \frac{\partial rm'_n}{\partial \theta s} & \frac{\partial rm'_n}{\partial \gamma} & \frac{\partial rm'_n}{\partial \alpha} & \frac{\partial rm'_n}{\partial \omega 0} & 0 & \frac{\partial rm'_n}{\partial xl\_n} & \frac{\partial rm'_n}{\partial yl\_n} & 0 \\ \frac{\partial \theta m'_n}{\partial xs} & \frac{\partial \theta m'_n}{\partial ys} & \frac{\partial \theta m'_n}{\partial \theta s} & \frac{\partial \theta m'_n}{\partial \gamma} & \frac{\partial \theta m'_n}{\partial \alpha} & \frac{\partial \theta m'_n}{\partial \omega 0} & & \frac{\partial \theta m'_n}{\partial xl\_n} & \frac{\partial \theta m'_n}{\partial yl\_n} & \end{bmatrix} \quad (4)$$

Next, a detection error covariance matrix S is calculated by using the equation (5) on the basis of the detection Jacobian matrix H which has been calculated, the covariance matrix P and a matrix R. The matrix R is an error covariance matrix of the detected position values and determined on the basis of sensor characteristics.

$$S = HPH^T + R \quad (5)$$

Next, the Karman gain matrix K is calculated by using the equation (6) on the basis of the calculated detection Jacobian matrix H, the detection error covariance matrix S and the covariance matrix P.

$$K = PH^T S^{-1} \quad (6)$$

Figure 9:
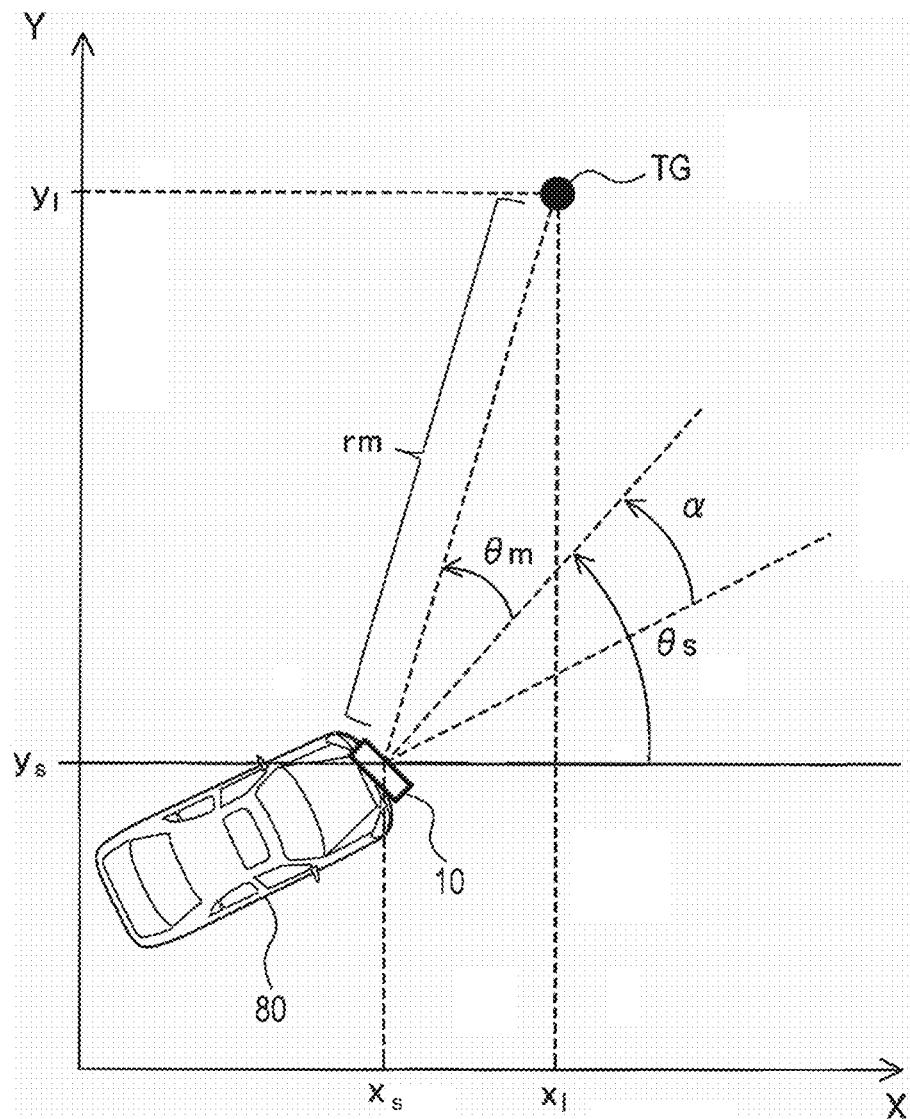
FIG. 9 is a view explaining a coordinate of the landmark.

Next, as shown in FIG. 9, a differential matrix Y between the m-th detected position values rm_m, θm_m, and the n-th estimated detection values is calculated. As shown in FIG. 7, the state quantity vector X is updated to the state quantity vector X'+KY. Further, as shown in FIG. 8, the covariance matrix P is updated to the covariance matrix (I-KH) P'. The X coordinate values and the Y coordinate values of all landmarks are updated in addition to the X coordinate value x1_n and the Y coordinate value y1_n of the n-th landmark.

$$X \leftarrow X' + KY \quad (7)$$

$$P \leftarrow (I - KH)P' \quad (8)$$

$$Y = \begin{bmatrix} rm\_m - rm\_n' \\ \theta m\_m - \theta m\_n' \end{bmatrix} \quad (9)$$

Next, in a case in which the n+1-th landmark and the k-th detected position values are associated together, similar to the case of the n-th landmark, the detection Jacobian matrix H is calculated on the basis of the estimated detection values of the n+1-th landmark, and the detection error covariance matrix S and the Karman gain matrix K are calculated, where k in a natural number.

Further, similar to the case of the n-th landmark, the state quantity vector X is updated by using the equation (7). At this updating, the state quantity vector X updated when the estimated detection values of the n-th landmark are used is assigned as the estimated vector X'. Further, the covariance matrix P is updated by using the equation (8). At this updating, the covariance matrix P, which has been updated when the estimated detection values of the n-th landmark are used, is assigned as the estimated covariance matrix P'. As previously described, the updating of the state quantity vector X and the covariance matrix P is repeated sequentially many times as specified by the number of combinations between the landmarks and the detected position values which have been associated together.

In the following S70, the stationary object, which has been newly detected in S20 of the current process, is registered as a new landmark. That is, the X coordinate value and the Y coordinate value of the new landmark are added to the state quantity vector X. Further, the self-covariance matrix of the new landmark and the mutual covariance matrix of the new landmark with another state quantity are added to the covariance matrix P.

A landmark in the registered landmarks, which is not associated to the detected position values during the cycle of the regulated number processes, is deleted. That is, the X coordinate value and the Y coordinate value of this landmark are eliminated from the state quantity vector X. Further, the self-covariance matrix and the mutual covariance matrix of this landmark are deleted from the covariance matrix P.

The operation flow returns to S20. In S20, the detected position values rm, θm and vm of the object, the detected speed value v and the detected yaw rate ω are acquired, and the position of the object including a moving body and/or a ground speed of the vehicle are calculated. In detail, the position of the object including a moving body and/or the ground speed of the vehicle are calculated on the basis of the mounting angle α of the radar 10 which has been updated at the previous processing cycle, and/or the vehicle speed v of the vehicle 80 and the yaw rate ω which have been corrected on the basis of the updated detection errors γ, ω0 of the odometry sensor 20.

After this, the processes of S30 to S70 are performed again. The operation flow returns to S20. The processes of S20 to S70 are repeatedly performed.

In the present embodiment, the process of S40 corresponds to the estimation process, the process of S60 corresponds to the updating process, and the process of S20 corresponds to the object recognition process.

3. Effects

The first embodiment previously described has the following effects.

(1) In the first embodiment, the X coordinate value xs and the Y coordinate value ys of the radar 10, the direction θs of the radar 10, the mounting angle α of the radar 10, and the detection errors γ, ω0 of the odometry sensor 20 are updated simultaneously on the basis of the estimated detection values of the landmark, and the differential matrix Y between the estimated detection values and the detected position values which have been associated together. This makes it possible to recognize the information of the objects around the vehicle 80 with high accuracy.

(2) In the embodiment, the position of the object and/or the ground speed of the vehicle 80 are calculated on the basis of the mounting angle α of the radar 10 which has been updated, and/or the detected speed value v and the detected yaw rate ω, which have been corrected by using the updated detection errors γ, ω0 of the odometry sensor 20. Accordingly, this makes it possible to increase the accuracy of the position information and/or the vehicle speed information.

(3) When the deviation quantity of the mounting angle α of the vehicle 80 from the reference angle exceeds the regulated angle quantity, and/or when the detection errors γ, ω0 of the odometry sensor 20 exceed the respective regulated error quantities, the notification device 40 provides the notification to a user of the vehicle 80 through the notification device. This allows the user to reliably use the applications on the basis of the detection results of the in-vehicle sensor device 100.

As previously described in detail, the present disclosure has been made in consideration of the foregoing circumstances, and the present disclosure provides the in-vehicle sensor device for detecting and recognizing objects present around a vehicle with high accuracy, and provides recognized object information. According to one aspect of the present disclosure, the in-vehicle sensor device updates the position information parameters, the mounting angle of the active sensor and the detection error of the odometry sensor, simultaneously in accordance with a difference between the estimated detection values of the stationary object and the detected position values of the stationary object. This corrects a deviation quantity of the mounting angle of the active sensor and the detection error of the odometry sensor, simultaneously. Accordingly, this makes it possible to recognize the object information around the vehicle with high accuracy.

Other Modifications

The scope of the present disclosure is not limited by the first embodiment previously described. It is possible for the present disclosure to have various modifications.

(a) In the embodiment previously described, the mounting angle α is used as an element of the state quantity vector X. However, it is acceptable to use a deviation of the mounting angle α to the reference angle, as an element of the state quantity vector X. In this case, it is sufficient to update the mounting angle α according to the updating of the deviation of the mounting angle α.

(b) The present embodiment has used the X coordinate value and the Y coordinate value of the radar 10, the direction of the radar 10, and the X coordinate value and the Y coordinate value of the landmarks. It is possible to use other position information parameters in order to specify the relative position relationship between the landmarks and the radar 10, for example, it is acceptable to use, as the other position information parameters, the X coordinate value and the Y coordinate value of the vehicle 80, the direction of the vehicle 80 and the X coordinate value and the Y coordinate value of the landmarks.

(c) The embodiment previously described has considered, as the detection errors of the odometry sensor, a proportional error of the speed of the vehicle and the offset error of the yaw rate only. However, it is acceptable to add a proportional error of the yaw rate as the detection errors of the odometry sensor.

(d) It is allowed to mount the radar 10 to ships, aircrafts, etc. as moving bodies.

(e) While each of specific embodiments of the present disclosure has been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

(f) It is possible for the present disclosure to have various modifications such as systems, programs, non-transitory computer readable storage mediums, object detection methods, etc., where systems have the in-vehicle sensor device previously described as a component, programs are performed by a computer as the processing part of the in-vehicle sensor device, non-transitory computer readable storage mediums storing those programs are semiconductor memories, and object detection methods as a computer implemented method for detecting objects.

What is claimed is:

1. An in-vehicle sensor device comprising:
an active sensor mounted to a moving body and configured to detect detected relative position values of a stationary object present around the moving body, the detected relative position values comprising a relative distance and relative azimuth between the moving body and the stationary object, the detected relative position values of the stationary object determined based on position information parameters of the active sensor that is mounted to the moving body;
an odometry sensor configured to detect a speed and a yaw rate of the moving body; and
a processing part which is configured to:
perform an initialization process in which initial values are assigned to each of (i) position information parameters of the active sensor, (ii) a mounting angle of the active sensor, and (iii) a detection error of the odometry sensor;
estimate estimated position information parameters of the active sensor during a repetition period based on (i) the position information parameters and movement of the moving body that is detected by the odometry sensor during the repetition period, (ii) the mounting angle of the active sensor, and (iii) the detection error of the odometry sensor;
estimate estimated relative position values of the stationary object during the repetition period based on the estimated position information parameters of the active sensor during the repetition period; and
update (i) relative position values of the stationary object, (ii) the mounting angle of the active sensor, and (iii) the detection error of the odometry sensor based on a difference between the estimated relative position values of the stationary object during the repetition period and the detected relative position values of the stationary object detected by the active sensor.

2. The in-vehicle sensor device according to claim 1, wherein
the processing part performs an object recognition which calculates at least one of a position of the objects and a ground speed of the objects based on the updated relative position values of the stationary object.

3. The in-vehicle sensor device according to claim 1, further comprising
providing a notification to a user when a deviation quantity of the mounting angle of the active sensor from a reference angle exceeds a regulated angle quantity, or when a detection error of the odometry sensor exceeds a regulated error quantity.

4. The in-vehicle sensor device according to claim 2, further comprising
providing a notification to a user when a deviation quantity of the mounting angle of the active sensor from a reference angle exceeds a regulated angle quantity, or when a detection error of the odometry sensor exceeds a regulated error quantity.

5. An in-vehicle sensor device comprising:
an active sensor mounted to a moving body and configured to detect detected relative position values of a stationary object present around the moving body, the detected relative position values comprising a relative distance and relative azimuth between the moving body and the stationary object, the detected relative position values of the stationary object determined based on position information parameters of the active sensor that is mounted to the moving body;
an odometry sensor configured to detect a speed and a yaw rate of the moving body; and
a processing device comprising:
a processor;
a non-transitory computer-readable storage medium; and
a set of computer-executable instructions stored on the non-transitory computer-readable storage medium that cause the processor to:
perform an initialization process in which initial values are assigned to each of (i) position information parameters of the active sensor, (ii) a mounting angle of the active sensor, and (iii) a detection error of the odometry sensor;
estimate estimated position information parameters of the active sensor during a repetition period based on (i) the position information parameters and movement of the moving body that is detected by the odometry sensor during the repetition period, (ii) the mounting angle of the active sensor, and (iii) the detection error of the odometry sensor;
estimate estimated relative position values of the stationary object during the repetition period based on the estimated position information parameters of the active sensor during the repetition period; and
update (i) relative position values of the stationary object, (ii) the mounting angle of the active sensor, and (iii) the detection error of the odometry sensor based on a difference between the estimated relative position values of the stationary object during the repetition period and the detected relative position values of the stationary object detected by the active sensor.

6. A method for estimating a position of a stationary object around a moving body using an active sensor mounted to the moving body and an odometry sensor, the method comprising:
detecting relative position values of the stationary object present around the moving body, the detected relative position values comprising a relative distance and relative azimuth between the moving body and the stationary object;
detecting a speed and a yaw rate of the moving body using the odometry sensor so as to estimate a position and a speed of the active sensor;
performing an initialization process in which initial values are assigned to each of (i) position information parameters of the active sensor, (ii) a mounting angle of the active sensor, and (iii) a detection error of the odometry sensor;
estimating estimated position information parameters of the active sensor during a repetition period based on (i) the position information parameters and movement of the moving body that is detected by the odometry sensor during the repetition period, (ii) the mounting angle of the active sensor, and (iii) the detection error of the odometry sensor;
estimating estimated relative position values of the stationary object during the repetition period based on the estimated position information parameters of the active sensor during the repetition period; and
updating (i) relative position values of the stationary object, (ii) the mounting angle of the active sensor, and (iii) the detection error of the odometry sensor based on a difference between the estimated relative position values of the stationary object during the repetition period and the detected relative position values of the stationary object detected by the active sensor.

* * * * *